United States Patent [19]

Carrow

[11] 4,056,594
[45] Nov. 1, 1977

[54] METHOD OF PRODUCING A FLEXIBLE EXTRUDATE OF A MIXTURE OF POLY(PHENYLENE SULFIDE) AND FILLER

[75] Inventor: Guy E. Carrow, Bartlesville, Okla.

[73] Assignee: Phillips Petroleum Company, Bartlesville, Okla.

[21] Appl. No.: 640,984

[22] Filed: Dec. 15, 1975

[51] Int. Cl.² ............................................. C08G 75/14
[52] U.S. Cl. .............................. 264/176 R; 260/42.43;
260/79.1; 264/127; 264/171; 264/210 R;
264/211; 264/323; 264/331
[58] Field of Search .................... 264/211, 176 R, 127,
264/323, 328, 329, 331, 210 R, 176 F, 171, 122;
260/139, 79, 79.1, 42.43

[56] References Cited
U.S. PATENT DOCUMENTS 3,196,486   7/1965   Shesler et al. ........................ 425/197
3,322,834   5/1967   Hill et al. ............................. 260/609
3,716,609   2/1973   Trocciola et al. .................... 264/331
3,954,932   5/1976   Coale .................................. 260/79.1

Primary Examiner—Jeffery R. Thurlow

[57] ABSTRACT

An improved method for the production of an extrudate of poly(phenylene sulfide) and filler with the resulting extrudate having a stiffness of less than 10,000 psi as determined by ASTM D747-70. The extrudate formed is very flexible. The method includes the step of applying pressure to a heated mixture of poly(phenylene sulfide) and filler and flowing the mixture through a first orifice into an expansion chamber and out of the expansion chamber through a second orifice. The extrudate exiting the second orifice is extruded into the atmosphere or into a mold cavity for the molding of a piece part. The resulting extrudate is flexible and can be used as a packing or gasket material.

4 Claims, 1 Drawing Figure

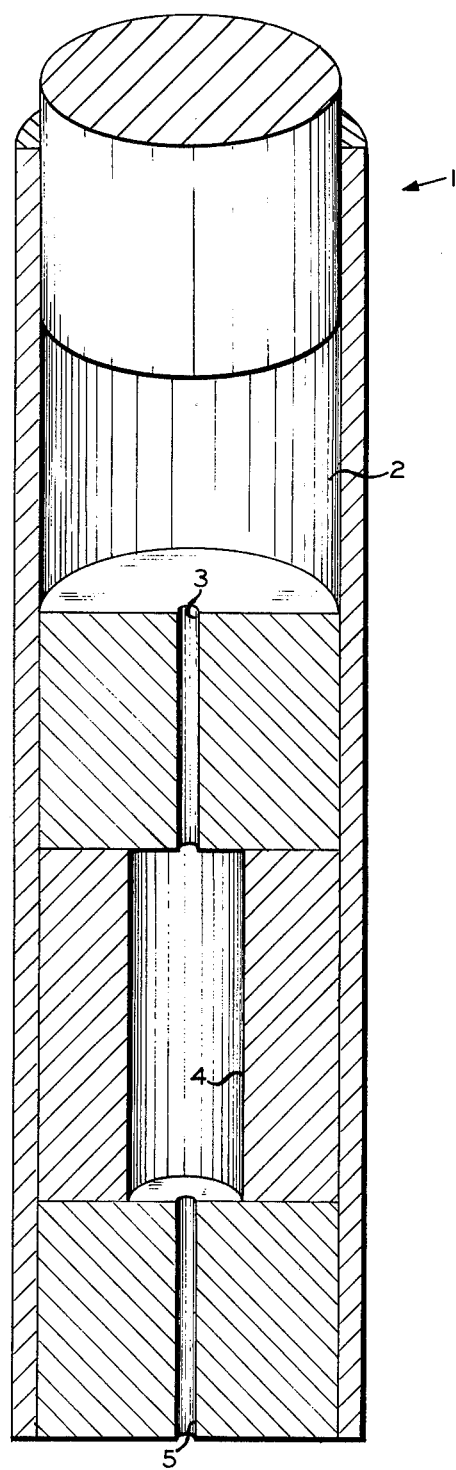

METHOD OF PRODUCING A FLEXIBLE EXTRUDATE OF A MIXTURE OF POLY(PHENYLENE SULFIDE) AND FILLER

The present invention relates to a method for producing a flexible extrudate from mixtures containing poly(phenylene sulfide) and a filler with the extrudate having a stiffness less than 10,000 psi as determined by ASTM D747-70 and is thus a product of high flexibility. The invention as disclosed herin is an improved method for producing a flexible extrudate from mixtures comprising poly(phenylene sulfide) and at least one filler, one of which is polytetrafluoroethylene. The product produced by a method of this invention is useful as a packing material or seal material for pumps and the like and is very flexible, can be porous and also provides good lubricating properties while in use. Flexibility is a difficult term to define in that all materials are flexible to a certain degree. As hereinafter used, the word "flexibility" is a property of a product which has a stiffness of less than 10,000 psi as measured by ASTM D747-70, a low stiffness value being equivalent to high flexibility. The product produced by the disclosed method is very flexible (not stiff) and has a stiffness below the lowest value which can be reliably measured by the above identified ASTM test and there are no other known standard tests for testing a flexibility as high (low stiffness) as that of the product as defined in the specification below.

The principal objects and advantages of the present invention are: to provide a metod for producing a flexible extrudate of a mixture of poly(phenylene sulfide) and a filler; to provide such a method which produces a uniform product of acceptable quality; to provide such a method which is simple and efficient; and to provide such a method which is well adapted for its intended use.

Other objects and advantages of the present invention will become apparent from the following description taken in connection with the accompanying drawings wherein are set forth by way of illustration and example certain embodiments of the present invention.

FIG. 1 is a sectional view in perspective of an apparatus used for the production of a flexible extrudate of poly(phenylene sulfide) and filler.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Reference numeral 1 designates generally an extrusion apparatus which is comprised of a material chamber 2 which is in communication with either a plunger type or screw type pressurizing means as is known in the art of extrusion. The chamber 2 has at one end thereof a first orifice or passage 3 which is illustrated as being elongate and communicating between the chamber 2 and an expansion chamber 4 which is downstream of the orifice 3. Downstream from the expansion chamber 4 is a second orifice or passage 5 which communicates between the expansion chamber 4 and the atmosphere in the structure illustrated. The orifice 5 is shown as elongate and it is to be understood that same can have any cross-sectional shape as is dictated by the particular product which is desired to be made, as for example, same can be round, square, oval or any other suitable shape. It is to be noted here that the orifice 5 can also communicate with a mold cavity (not shown) wherein the product can be dispensed into the mold cavity to form a molded piece part. The expansion chamber 4 should have a cross-sectional are normal to the axis of the apparatus 1 which is substantially larger as, for example, 10 times in area than the cross-sectional area of the orifices 3 and 5.

In operation the chamber 2 is charged with a suitable mixture of poly(phenylene sulfide) and a selected filler as hereinafter disclosed and is heated to a temperature sufficient to soften the mixture to a flowable state under a predetermined pressure as, for example, 12,000 psi to 30,000 psi and the temperature is preferably in a range of approximately 650° F to 750° F. Pressure is applied to the heated mixture forcing same to flow through the orifice 3 then through the expansion chamber 4 and then through the orifice 5 and out into the atmosphere at which point it expands approximately 2 to 4 times the size of the orifice 5 and retains generally the shape of the orifice 5 with the extrudate being an integral or cohesive mass. It is preferred that before charging the chamber with the mixture of poly(phenylene sulfide) and filler that the mixture be precured so as to control the melt flow thereof to facilitate the production of the flexible extrudate. Precuring is preferably accomplished by heating the polymer in an atmosphere containing oxygen at a temperature of approximately 450° F to 600° F for a time period of 4 hours to 24 hours.

Material suitable for use in the above-described process includes poly(phenylene sulfide) in an amount of 30 percent to 80 percent by weight of the total mixture and also includes at least one filler material, one of which is polytetrafluoroethylene in an amount of approximately 70 percent to 20 percent by weight of the total mixture weight. Other suitable filler materials can be added to the mixture of poly(phenylene sulfide) and polytetrafluoroethylene with the filler materials including such fillers as glass fibers, asbestos fibers, carbon fibers, $MoS_2$, and the like. The type of filler used will be determined by the particular end use which is expected of the extrudate produced by the above-described process. The mixture of poly(phenylene sulfide) and filler is made by blending constituent parts of the mixture, as for example, in a high speed blender to assure uniformity of mix. The mixture can be precured as described above and can be followed by a secondary precure step wherein the mixture can be heated to a temperature of between approximately 675° F to 750° F for a time period of approximately ½-hours to 2 hours. Such precuring is well knwon in the art and need not be further discussed in detail herein. The mixture is then ready for extrusion as described above.

The poly(phenylene sulfide) used herein can be made in accordance to U.S. Pat. No. 3,322,834 issued to H. D. Hill, Jr. et al, May 30, 1967.

By way of illustration, the following example is provided.

EXAMPLE I

In the following example, the poly(phenylene sulfide) was prepared according to Example I of U.S. Pat. No. 3,322,834. It had an uncured melt flow (ASTM D1238-651, 5 kg at 315° C) above 2700 g/10 minutes (limit of instrument) and a density (ASTM D1505-68) of 1.3 g/cc.

A blend was prepared consisting of 50 parts by weight of poly(phenylene sulfide), 25 parts by weight of glass fibers (⅛ - ¼ inch long), 25 parts by weight polytetrafluoroethylene powder. The dry blend was stirred in an intensive mixer for about 3 minutes at room temperature. It was then spread on a tray, i.e., a layer about ½ inch deep and heated overnight at 520° F (271° C) and at 700° F (371° C) for 1 hour in order to partially cure the polymer.

300 g. of the partially cured material was placed into the chamber 2 of the apparatus and the apparatus was heated in an oven to 700° F (371° C); 16,000 psi force was applied by means of a hydraulic ram to the hot chamber and an extrudate was formed through a ⅛-inch (3.18 mm) diameter orifice 5. An expanded and flexible, that is, limp and very easily bent under its own weight, rope-like product ⅜-inch (9.54 mm) in diameter was formed. The 300 g charge produced about 25 linear feet of product (about 7 meters).

A second example is provided in which the conditions of Example I were used with the only difference being that an orifice 5 having a square cross-section with ¼-inch sides was used in place of the ⅛ diameter orifice as in Example I. The resulting product was a flexible extrudate, that is limp and very easily bent under its own weight, having a substantially square configuration ¼-inch on each side being the resulting dimension of the extrudate.

It is known in the art of extrusion that mixtures of poly(phenylene sulfide) and filler results in a product of high stiffness and low flexibility. Experimentation has shown that the addition of polytetrafluoroethylene to poly(phenylene sulfide) results in an extrudate which is flexible. Flexibility as used herein is determined to mean a product having a stiffness as determined by ASTM D747-70 of less than 10,000 psi, the minimum which can be reliably measured by this test. Thus articles of such low stiffness are considered to have high flexibility. The term "flexibility" is difficult to define in that the standard test available for testing flexibility is such that it is not adequate to measure this high a flexibility therefore requiring a definition of flexibility in terms of stiffness as being less than that reliably measurable by the above identified ASTM test.

It is to be understood that while I have illustrated and described certain forms of my invention, it is not to be limited to the specific forms or embodiments herein described and shown.

What is claimed and desired to be secured by Letters Patent is:

1. A method for producing an extrudate of a poly(phenylene sulfide) mixture having a stiffness of less than 10,000 psi as measured by ASTM D 747-70, said method comprising:
   a. precuring a mixture of poly(phenylene sulfide and at least one filler, at least one of said fillers is polytetrafluoroethylene in an amount of at least about 20 percent by weight of the total mixture weight and said poly(phenylene sulfide) is in an amount of at least about 30 percent by weight of the total mixture weight, said mixture being precured an amount sufficient to produce a flexible extrudate upon extrusion;
   b. applying pressure to said mixture, said mixture being at a temperature sufficient to soften the mixture to a flowable state under a predetermined pressure;
   c. flowing said mixture through a first orifice;
   d. flowing said mixture from said first orifice through an expansion chamber which is in downstream communication with said first orifice; and
   e. flowing said mixture from the expansion chamber through a second orifice which is in downstream communication with said expansion chamber, said expansion chamber having a cross-sectional area about 10 times larger in area than the first and second orifices.

2. The method as set forth in claim 5 wherein said mixture is at a temperature above 650° F.

3. The method as set forth in claim 2 wherein said temperature is between approximately 650° F and 750° F.

4. The method as set forth in claim 2 wherein said mixture contains about 20 percent to 70 percent by weight of polytetrafluoroethylene and about 30 percent to 80 percent by weight of poly(phenylene sulfide).

* * * * *

UNITED STATES PATENT AND TRADEMARK OFFICE
CERTIFICATE OF CORRECTION

PATENT NO. : 4,056,594

DATED : November 1, 1977

INVENTOR(S) : Guy E. Carrow

It is certified that error appears in the above—identified patent and that said Letters Patent are hereby corrected as shown below:

Column 4, claim 2, line 1, "5" should be --- 1 ---.

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*